US007248079B2

(12) United States Patent
Bhattacharya et al.

(10) Patent No.: US 7,248,079 B2
(45) Date of Patent: Jul. 24, 2007

(54) DIFFERENTIAL BUFFER CIRCUIT WITH REDUCED OUTPUT COMMON MODE VARIATION

(75) Inventors: Dipankar Bhattacharya, Macungie, PA (US); Makeshwar Kothandaraman, Whitehall, PA (US); John C. Kriz, Palmerton, PA (US); Bernard L. Morris, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 61 days.

(21) Appl. No.: 11/285,800

(22) Filed: Nov. 23, 2005

(65) Prior Publication Data

US 2007/0115030 A1    May 24, 2007

(51) Int. Cl.
  *H03K 19/0175*  (2006.01)
(52) U.S. Cl. .......................................... 326/83; 326/26
(58) Field of Classification Search .................. 326/21, 326/26, 27, 30, 82–87
See application file for complete search history.

(56) References Cited

U.S. PATENT DOCUMENTS 5,977,796 A * 11/1999 Gabara ........................ 326/86
6,329,843 B1 * 12/2001 Hirata et al. ................. 326/82
6,590,422 B1 *  7/2003 Dillon .......................... 326/86
6,603,348 B1 *  8/2003 Preuss et al. ............... 327/563
6,867,618 B2 *  3/2005 Li et al. ...................... 326/83
6,975,135 B1 * 12/2005 Bui ............................. 326/29
7,012,450 B1 *  3/2006 Oner et al. .................. 326/86
7,193,443 B1 *  3/2007 Smith et al. ................. 326/83
2002/0190754 A1 * 12/2002 Brunolli ...................... 326/83
2003/0085737 A1 *  5/2003 Tinsley et al. .............. 326/86
2007/0024320 A1 *  2/2007 De Laurentiis et al. ....... 326/63

* cited by examiner

Primary Examiner—Don Le (57) ABSTRACT

A differential buffer circuit includes a current source, a current sink, and a switching circuit connected to the current source at a first node and connected to the current sink at a second node. The switching circuit is operative to selectively control a direction of current flowing through differential outputs of the buffer circuit in response to at least a first control signal. The buffer circuit further includes a common mode detection circuit and a common mode control circuit. The common mode detection circuit is operative to detect an output common mode voltage of the buffer circuit and to generate a second control signal representative of the output common mode voltage. The common mode control circuit includes a first terminal connected to the current source and a second terminal connected to the current sink. The common mode control circuit is operative to selectively control the output common mode voltage of the buffer circuit as a function of the second control signal.

21 Claims, 5 Drawing Sheets

DIFFERENTIAL BUFFER CIRCUIT WITH REDUCED OUTPUT COMMON MODE VARIATION

FIELD OF THE INVENTION

The present invention relates generally to electronic circuits, and more particularly relates to enhanced differential buffer circuits.

BACKGROUND OF THE INVENTION

Buffer circuits (e.g., output buffers and bidirectional buffers) are employed in a variety of electronic devices and applications, particularly networking applications involving high-speed data transfer applications. In order to ensure interoperability between such electronic devices, differential input/output (I/O) buffers are often employed which comply with a set of electrical specifications set forth in one or more standards. One common standard for differential I/O interfaces is the Institute of Electrical and Electronics Engineers (IEEE) 1596.3 standard for low-voltage differential signaling (LVDS). The IEEE 1596.3 standard specifies signaling levels for the high-speed/low-power physical layer interface. It also defines the common mode range of an LVDS buffer. The IEEE 1596.3 standard is set forth in the document IEEE Std. 1596.3, entitled *IEEE Standard for Low-Voltage Differential Signals* (LVDS) *for Scalable Coherence Interface* (SCI), 1996 edition, which is incorporated by reference herein.

In order to satisfy the stringent requirements set forth in such standards, it is necessary to minimize output common mode variation in the buffer circuit. One known approach for reducing output common mode variation in a buffer circuit is to utilize a process, voltage and temperature (PVT) control reference circuit for supplying bias signals to the buffer circuit which track variations in PVT conditions to which the buffer circuit may be subjected. These bias signals can be replicated using conventional replica bias circuitry (e.g., current mirrors, etc.) so that a single control reference circuit can support several buffer circuits. This approach, however, generally does not provide sufficient control of the output common mode variation as may be required to meet a particular standard due, at least in part, to direct current (DC) offsets in operational amplifiers (opamps) used in the control reference circuit and/or buffer circuit, relative voltage (current-resistance (IR)) drops between the PVT control reference circuit and the buffer circuit, and/or device mismatches between the replica bias circuitry and the buffer circuit. Each of these factors contributes to an overall inaccuracy of the control reference circuit and hence reduces an effectiveness of the control reference circuit in controlling the output common mode voltage of the buffer circuit.

Another known approach for reducing output common mode variation in a buffer circuit is to employ current referencing in conjunction with a common mode feedback scheme using an opamp. This approach provides a more accurate mechanism for controlling output common mode variation in the buffer circuit compared to the PVT reference generator approach previously described. However, this circuit arrangement requires the use of an opamp to implement the common mode feedback scheme. The use of an opamp and accompanying compensation circuitry required by the opamp significantly increases a chip area of the buffer circuit. Moreover, a current reference circuit is typically required for each buffer circuit in order to guarantee the accuracy necessary to meet certain standards (e.g., IEEE 1596.3). When the buffer circuit employing common mode feedback is used in conjunction with a PVT reference circuit for supplying bias current thereto, the number of buffer circuits that can be driven by a single PVT reference circuit is significantly reduced. Therefore, the total number of PVT reference circuits required in a given IC undesirably increases, especially in integrated circuits utilizing a large number of buffer circuits. This substantially increases a cost of the IC.

Accordingly, there exists a need for an improved differential buffer circuit that has reduced output common mode variation and yet does not suffer from one or more of the problems exhibited by conventional buffer circuits.

SUMMARY OF THE INVENTION

The present invention meets the above-noted need by providing, in an illustrative embodiment, an improved differential buffer circuit capable of exhibiting a reduced output common mode voltage. To accomplish this, the illustrative differential buffer circuit incorporates a common mode control circuit, thereby providing local feedback control without requiring the use of a local operational amplifier and related compensation circuitry. Consequently, the silicon area required by the differential buffer circuit is advantageously reduced compared to conventional differential buffer circuit configurations.

In accordance with one aspect of the invention, a differential buffer circuit includes a current source, a current sink, and a switching circuit connected to the current source at a first node and connected to the current sink at a second node. The switching circuit is operative to selectively control a direction of current flowing through differential outputs of the buffer circuit in response to at least a first control signal. The buffer circuit further includes a common mode detection circuit and a common mode control circuit. The common mode detection circuit is operative to detect an output common mode voltage of the buffer circuit and to generate a second control signal representative of the output common mode voltage. The common mode control circuit includes a first terminal connected to the current source and a second terminal connected to the current sink. The common mode control circuit is operative to selectively control the output common mode voltage of the buffer circuit as a function of the second control signal.

In accordance with another aspect of the invention, an integrated circuit includes a plurality of differential buffer circuits, at least a given one of the differential buffer circuits including a current source for supplying a first current as a function of a first bias signal, a current sink for returning a second current as a function of a second bias signal, and switching circuitry connected to the current source at a first node and connected to the current sink at a second node. The switching circuitry is operative to selectively control a direction of current flowing through differential outputs of the buffer circuit in response to at least a first control signal. The buffer circuit further includes a common mode detection circuit and a common mode control circuit. The common mode detection circuit is operative to detect an output common mode voltage of the buffer circuit and to generate a second control signal representative of the output common mode voltage. The common mode control circuit includes a first terminal connected to the current source and a second terminal connected to the current sink. The common mode control circuit is operative to selectively control the output common mode voltage of the buffer circuit as a function of the second control signal.

In accordance with a third aspect of the invention, a bias circuit operative to generate at least first and second bias signals for biasing a differential buffer circuit includes an "H" bridge circuit. The "H" bridge circuit includes a current source, a current sink, and switching circuitry connected to the current source at a first node and connected to the current sink at a second node. The switching circuitry is operative to control a direction of current flowing through differential outputs of the "H" bridge circuit in response to at least a first control signal. The bias circuit further includes a common mode detection circuit connected to the differential outputs of the "H" bridge circuit, the common mode detection circuit being operative to detect an output common mode voltage of the "H" bridge circuit and to generate a second control signal representative of the output common mode voltage. The bias circuit includes a common mode control circuit having a first terminal connected to the current source and a second terminal connected to the current sink. The common mode control circuit is operative to selectively control the output common mode voltage of the "H" bridge circuit as a function of the second control signal.

The bias circuit further includes first and second operational amplifiers. The first operational amplifier has a first input connected to a first of the differential outputs of the "H" bridge circuit, a second input adapted to receive a first reference signal, and an output for generating the first bias signal. The second operational amplifier has a first input connected to a second of the differential outputs of the "H" bridge circuit, a second input adapted to receive a second reference signal, and an output for generating the second bias signal.

These and other features and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative LVDS buffer circuits. It should be understood, however, that the present invention is not limited to these or any other particular circuit arrangements. Rather, the invention is more generally applicable to techniques for reducing output offset voltage, commonly referred to as output common mode voltage, in a differential buffer circuit. Although implementations of the present invention are described herein with specific reference to p-channel metal-oxide-semiconductor (PMOS) and n-channel metal-oxide-semiconductor (NMOS) transistor devices, as may be formed using a complementary metal-oxide-semiconductor (CMOS) fabrication process, it is to be understood that the invention is not limited to such transistor devices and/or such a fabrication process, and that other suitable devices, such as, for example, bipolar junction transistors (BJTs), etc., and/or fabrication processes (e.g., bipolar, BiCMOS, etc.), may be similarly employed, as will be apparent to those skilled in the art.

Figure 1:
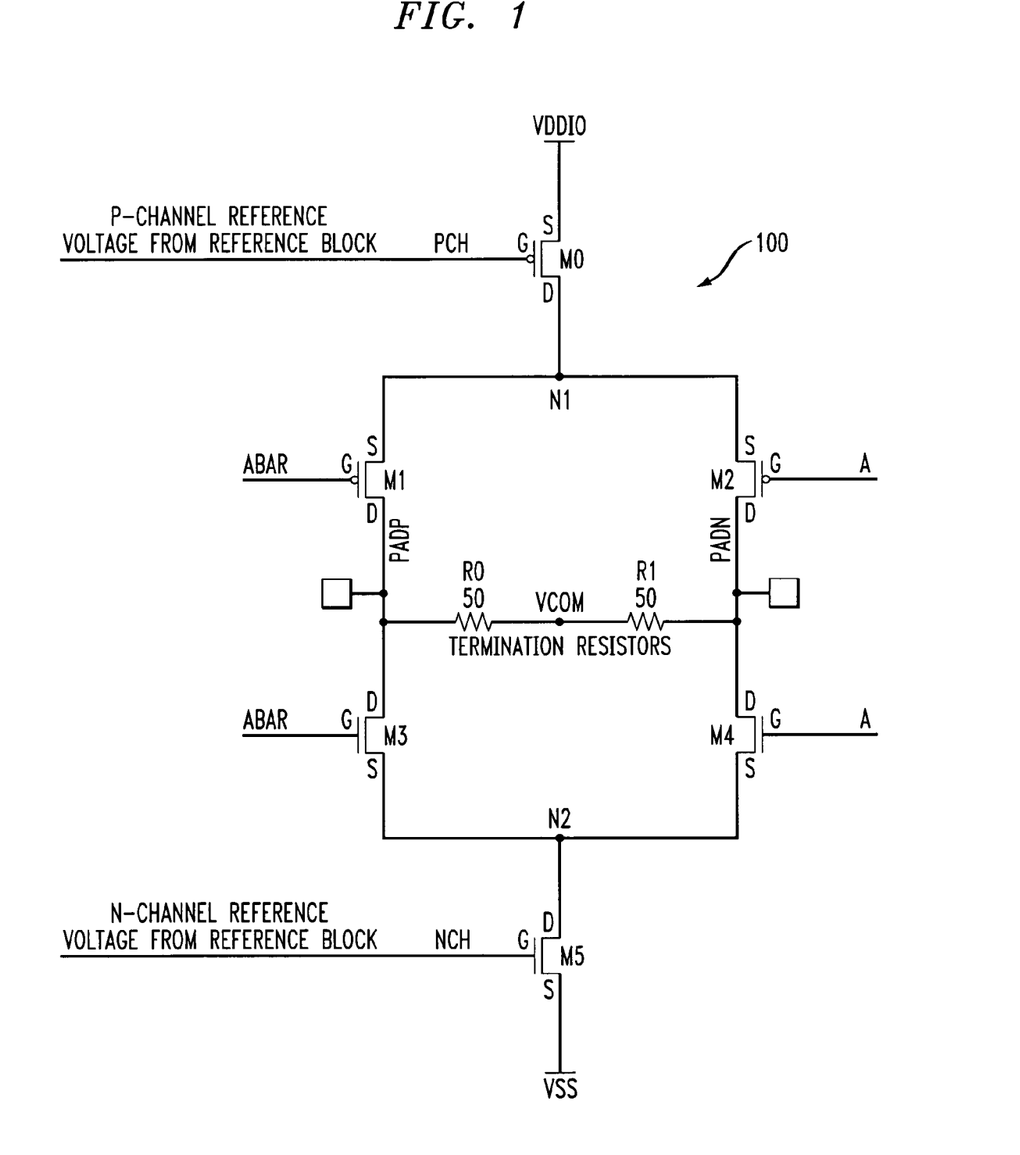
FIG. 1 is a schematic diagram depicting an illustrative "H" bridge circuit which may be used in a differential buffer circuit.

FIG. 1 is a schematic diagram depicting an illustrative "H" bridge circuit 100 which may be used, for example, in a LVDS output buffer. The "H" bridge circuit 100 includes a PMOS device M0 and an NMOS device M5 configured to operate as a current source and a current sink, respectively. PMOS devices M1 and M2 and NMOS devices M3 and M4 function as switches which selectively turn on or off depending on one or more data input signals supplied to the "H" bridge circuit 100. As will be described in further detail below, a direction of current flowing through a differential output of the "H" bridge circuit 100 can be selectively controlled as a function of the data input signals presented to the circuit.

The "H" bridge circuit 100 is preferably configured such that a source (S) of device M0 is adapted for connection to a first voltage supply, which may be VDDIO, a drain (D) of M0 is connected to a source of device M1 and a source of device M2 at node N1, and a gate (G) of M0 is adapted for receiving a first bias signal, PCH. A source of device M5 is adapted for connection to a second voltage supply, which may be VSS, a drain of M5 is connected to a source of device M3 and a source of device M4 at node N2, and a gate of M5 is adapted for receiving a second bias signal, NCH. Bias signals PCH and NCH may be supplied by an external reference block (not shown) and are used for controlling a magnitude of the source and sink currents, respectively.

Drains of devices M1 and M2 are preferably connected to drains of devices M3 and M4 at nodes PADP and PADN, respectively. Node PADP is preferably a first signal pad, which may be a positive output pad, of the "H" bridge circuit 100 and node PADN is preferably a second signal pad, which may be a negative output pad, of the circuit. Nodes PADP and PADN form a differential output of the "H" bridge circuit 100. External termination resistors, namely, resistors R0 and R1, are preferably connected in series between the differential outputs of the "H" bridge circuit 100. Specifically, a first terminal of resistor R0 is connected to node PADP, a first terminal of resistor R1 is connected to node PADN, and second terminals of R0 and R1 are connected together at a common node, VCOM. Each termination resistor R0, R1 preferably has a resistance of about 50 ohms, as is common in output termination circuitry, although the present invention is not limited to the specific resistance values shown. Gates of devices M2 and M4 are adapted for receiving a first input signal, A, and gates of devices M1 and M3 are adapted for receiving a second input signal, ABAR, which is preferably a logical complement of signal A.

It is to be appreciated that, because a metal-oxide-semiconductor (MOS) device is symmetrical in nature, and thus bidirectional, the assignment of source and drain designations in the MOS device is essentially arbitrary. Therefore, the source and drain of a given device may be referred to herein generally as first and second source/drains, respectively, where the term "source/drain" in this context denotes a source or a drain.

When input signal A applied to the gates of devices M2 and M4 is a logic high ("1"), M4 will be turned on and M2 will be turned off. Input signal ABAR applied to the gates of devices M1 and M3, being a logical complement of signal A, will be a logic low ("0"), thereby turning on M1 and turning off M3. In this scenario, current generated by the current source comprising device M0 will be steered through device M1, through pad node PADP, out of the "H" bridge circuit through termination resistors R0 and R1, back into the circuit through pad node PADN, through device M4 and through the current sink comprising device M5 to VSS (e.g., ground). Likewise, when signal A is a logic low, device M2 will be turned on and device M4 will be turned off. Signal ABAR will be a logic high, thereby turning on device M3 and turning off device M1. In this case, current generated by device M0 will be steered through device M2, through pad node PADN, out of the "H" bridge circuit through termination resistors R0 and R1, back into the circuit through pad node PADP, through device M3 and through device M5 to VSS.

The direction of the current through termination resistors R0, R1 will be from node PADP to node PADN when the input data signal A is high, and from node PADN to node PADP (i.e., reversed) when signal A is low. Node PADP will be at a higher voltage potential relative to node PADN when data signal A is high, and node PADP will be at a lower voltage potential relative to node PADN when signal A is low. Thus, a direction of the current flowing through the termination resistors R0, R1 can be selectively controlled as a function of the input data signals A and ABAR.

Figure 2:
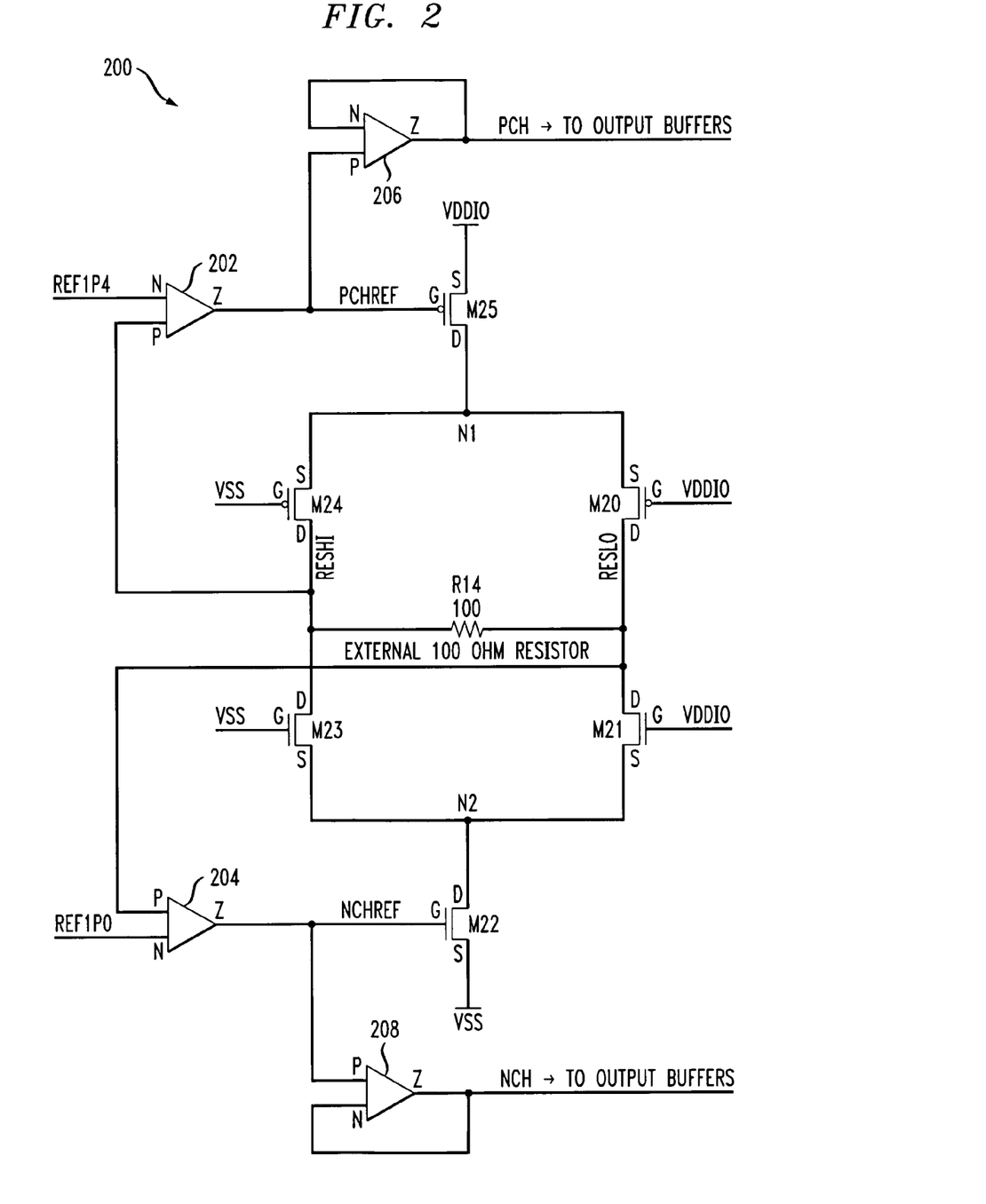
FIG. 2 is a schematic diagram depicting an illustrative reference bias circuit which may be used for generating bias signals used in the "H" bridge circuit shown in FIG. 1.

FIG. 2 is a schematic diagram depicting an illustrative reference bias circuit 200 which may be used for generating the bias signals PCH and NCH used in the "H" bridge circuit 100 shown in FIG. 1. The reference bias circuit 200 includes a reference "H" bridge including PMOS devices M20, M24 and M25, and NMOS devices M21, M22 and M23 connected in a manner similar to the "H" bridge circuit 100 of FIG. 1. Preferably, the reference "H" bridge is substantially matched, at least in terms of device sizes, etc., to the "H" bridge circuit 100. A source of device M25 is adapted for connection to first voltage supply VDDIO, a drain of M25 is connected to sources of devices M24 and M20 at node N1, and a gate of M25 is adapted for receiving a first bias signal, PCHREF. A drain of device M24 is connected to a drain of device M23 at node RESHI, a drain of device M20 is connected to a drain of device M21 at node RESLO, a gate of M24 is adapted for connection to second voltage supply VSS, and a gate of M20 is adapted for connection to VDDIO. Nodes RESHI and RESLO form differential outputs of the reference "H" bridge. Sources of devices M23 and M21 are preferably connected to a drain of device M22 at node N2. A gate of device M23 is adapted for connection to VSS and a gate of device M21 is adapted for connection to VDDIO. A source of device M22 is adapted for connection to VSS, and a gate of M22 is adapted for receiving a second bias signal, NCHREF. Devices M25 and M22 serve as a current source and current sink, respectively, and devices M20, M21, M23 and M24 function as switches to selectively control the direction of current flowing through the differential outputs RESHI, RESLO of the reference "H" bridge circuit.

An external termination resistor, R14, having a resistance of about 100 ohms is preferably connected between nodes RESHI and RESLO. Termination resistor R14 has a resistance that is preferably substantially matched to the resistance of the series combination of termination resistors R0 and R1 in the circuit 100 of FIG. 1. With the gates of devices M20, M21, M23, M24 connected in the manner shown, M24 and M21 will be turned on and M20 and M23 will be turned off. Therefore, current will flow from the current source comprising device M25, through device M24, through output node RESHI, through termination resistor R14, through node RESLO, through device M21, through the current sink comprising device M22, to VSS.

In order to control the common mode voltage at the differential output nodes PADP and PADN of the "H" bridge circuit 100 shown in FIG. 1, the reference bias circuit 200 preferably includes a PVT control block which incorporates a replica bias circuit. The PVT control block employs one or more feedback loops to generate the bias signals PCH and NCH used in the "H" bridge circuit 100 (FIG. 1). In a first feedback loop, a first operational amplifier 202 is configured having a first input, which may be a non-inverting (P) input, connected to output node RESHI of the reference "H" bridge, a second input, which may be an inverting (N) input, adapted for receiving a first reference signal REF1P4 (e.g., about 1.4 volts), and an output (Z) for generating the first bias signal PCHREF supplied to the gate of device M25. In accordance with feedback control principles, operational amplifier 202 will control the voltage at the gate of device M25 so as to maintain a voltage at node RESHI which is substantially equal to the first reference signal REF1P4.

In a second feedback loop, a second operational amplifier 204 is configured having a first input, which may be a non-inverting input, connected to output node RESLO of the reference "H" bridge, a second input, which may be an inverting input, adapted for receiving a second reference signal REF1P0 (e.g., about 1.0 volts), and an output for generating the second bias signal NCHREF supplied to the gate of device M22. Operational amplifier 204 will control the voltage at the gate of device M22 so as to maintain a voltage at node RESLO which is substantially equal to the second reference signal REF1P0.

In order to drive a large number of output buffers (e.g., 64), as is often required for some applications, bias signal PCHREF generated at the output of operational amplifier 202 and bias signal NCHREF generated at the output of operational amplifier 204 are buffered using operational amplifiers 206 and 208, respectively, connected in a unity gain configuration. Specifically, a first input, which may be a non-inverting input, of operational amplifier 206 is adapted for receiving the bias signal PCHREF and a second input, which may be an inverting input, of operational amplifier 206 is connected to an output of operational amplifier 206 for generating the bias signal PCH supplied to the gate of device M0 in the "H" bridge circuit 100 of FIG. 1. Similarly, a first input, which may be a non-inverting input, of operational amplifier 208 is adapted for receiving bias signal NCHREF and a second input, which may be an inverting input, of operational amplifier 208 is connected to an output of operational amplifier 208 for generating the bias signal NCH supplied to the gate of device M5 in the "H" bridge circuit 100 of FIG. 1.

One disadvantage of this approach is that operational amplifiers, particularly operational amplifiers 206 and 208, typically have non-zero DC offsets associated therewith due, at least in part, to mismatches in one or more properties (e.g., threshold voltage, etc.) of MOS devices included therein. These DC offsets are not compensated for since the operational amplifiers 206, 208 are not connected within the feedback loops. Consequently, the bias signals appearing on the gates of devices M0 and M5 (FIG. 1) may be different from the bias signals appearing on the gates of devices M25 and M22, respectively, by several millivolts. In addition, the bias voltages generated in bias circuit 200 are referenced to the local voltage supplies VDDIO and VSS (e.g., ground). As in the case of any large integrated circuit, the local voltage supply levels at the output buffer circuit may differ considerably from the supply levels at the reference bias circuit (e.g., by a few millivolts or more), depending at least in part on the proximity of the reference bias circuit 200 relative to the output buffer circuit 100 (FIG. 1). Furthermore, device properties often vary across the silicon wafer leading to mismatches in MOS device characteristics between the buffer circuit and the reference bias circuit. The cumulative effect of these mismatches often produces a DC offset of about 10 to 20 millivolts on the bias voltages PCH and NCH appearing at the gates of devices M0 and M5, respectively, of the buffer circuit. Since these offsets are generally random in nature, they often affect the PMOS current source and the NMOS current sink in different directions to make the output common mode voltage of the buffer circuit significantly different from its intended value.

Figure 3:
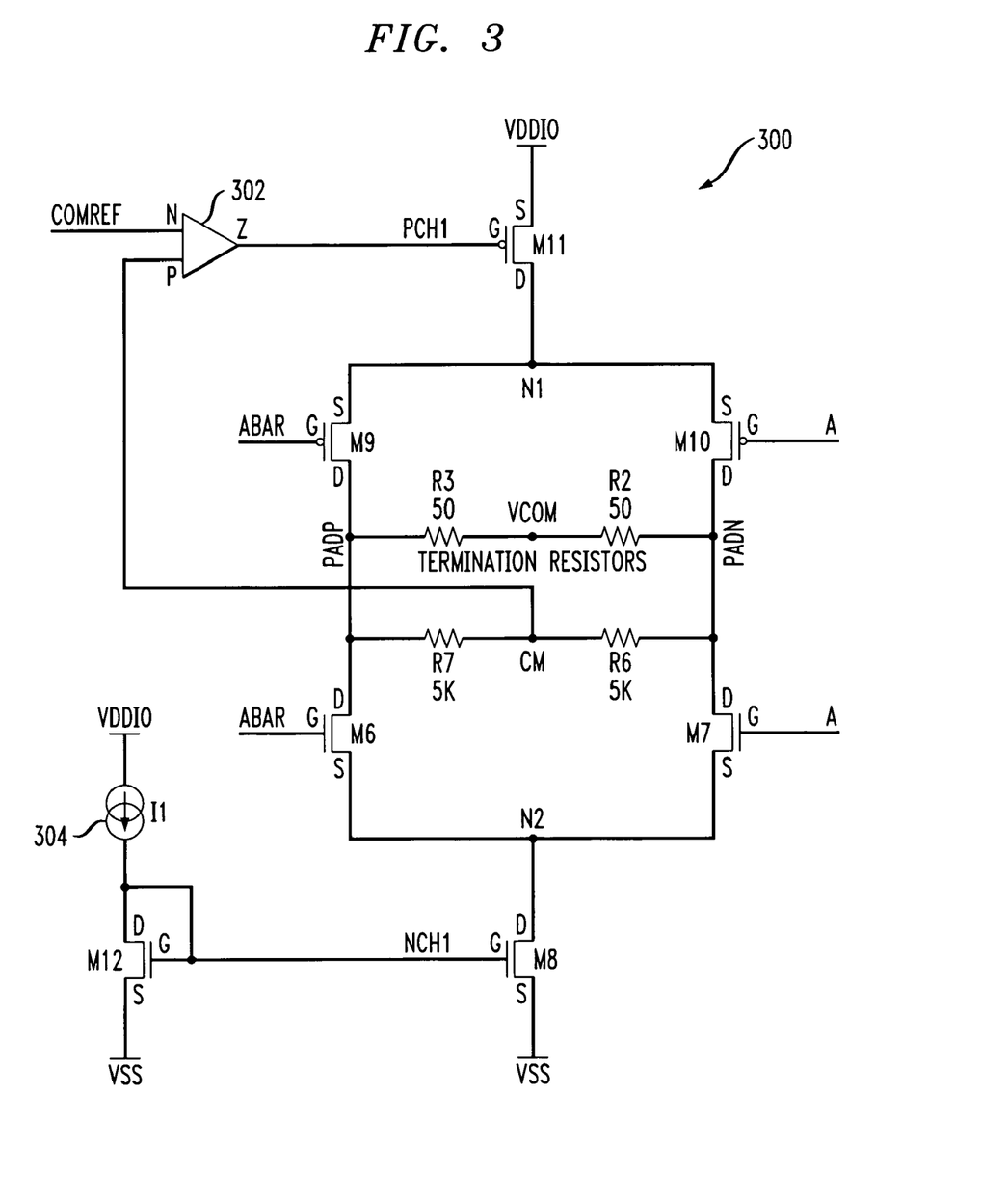
FIG. 3 is a schematic diagram depicting an illustrative differential buffer circuit utilizing a current referencing scheme in combination with local common mode feedback control.

FIG. 3 is a schematic diagram depicting an illustrative differential buffer circuit 300 utilizing a current referencing scheme in combination with local common mode feedback control. Buffer circuit 300 employs an "H" bridge which is configured in a manner consistent with the "H" bridge circuit 100 shown in FIG. 1 and described above. The "H" bridge in buffer circuit 300 includes a current source comprising PMOS device M11, a current sink comprising NMOS device M8, PMOS switch devices M9 and M10, and NMOS switch devices M6 and M7. A source of device M11 is adapted for connection to first voltage supply VDDIO, a drain of M11 is connected to sources of devices M9 and M10 at node N1, and a gate of M11 is adapted for receiving a first bias signal, PCH1. A drain of device M9 is connected to a drain of device M6 at node PADP, a drain of device M10 is connected to a drain of device M7 at node PADN, a gate of M10 is adapted for receiving a first data signal A, and a gate of M9 is adapted for receiving a second data signal ABAR, which is a logical complement of signal A. Nodes PADP and PADN are preferably signal pads which form a differential output of the buffer circuit 300.

Sources of devices M6 and M7 are preferably connected to a drain of device M8 at node N2. A gate of device M6 is adapted for receiving data signal ABAR and a gate of device M7 is adapted for receiving data signal A. A source of device M8 is adapted for connection to VSS, and a gate of M8 is adapted for receiving a second bias signal, NCH1. External termination resistors, namely, resistors R2 and R3, are preferably connected in series between the differential outputs PADP, PADN of the buffer circuit 300. Two additional resistors, namely, R6 and R7, connected in series between the differential outputs PADP and PADN serve to monitor the output common mode voltage of buffer circuit 300. Specifically, a first terminal of resistor R6 is connected to node PADN, a second terminal of R6 is connected to a first terminal of resistor R7 at node CM, and a second terminal of R7 is connected to output node PADP. Resistors R6, R7 are preferably high in resistance (e.g., greater than about 5 kilo ohms each) so as to minimize the amount of current flowing through R6 and R7.

The output common mode voltage at node CM is fed to a non-inverting input of an operational amplifier 302. An inverting input of the operational amplifier 302 is adapted for receiving a common mode reference signal COMREF. The common mode reference signal CMOREF may be generated using a voltage divider connected between VDDIO and VSS, although alternative circuitry for generating the reference common mode signal is similarly contemplated. Bias signal PCH1 supplied to the gate of device M11 is generated at an output of operational amplifier 302 and will be a function of the difference between the detected output common mode voltage at node CM and the reference common mode signal COMREF. This local feedback loop implemented using operational amplifier 302 adjusts the gain of device M11 so as to maintain the output common mode voltage at node CM substantially equal to the common mode reference signal COMREF.

The bias signal NCH1 supplied to the gate of device M8 may be generated, for example, by a simple current mirror circuit comprising a constant current source 304 coupled to a diode-connected NMOS device M12. Alternative bias circuit arrangements are similarly contemplated. The output current in buffer circuit 300 may be selectively controlled as a function of a reference current, I1, of constant current source 304. In order to more closely track variations in PVT conditions to which the buffer circuit 300 may be subjected, and therefore more closely control the output common mode voltage, reference current I1 may be generated elsewhere (e.g., external to the buffer circuit 300), such as by a PVT control circuit, and supplied to device M12.

While the buffer circuit 300 can be used to more precisely control output common mode voltage, this circuit arrangement requires an operational amplifier in each buffer circuit. Operational amplifiers, along with their associated compensation circuitry, often consume significant silicon area, thereby increasing an overall size of the buffer circuit. In applications requiring a large number of buffer circuits (e.g., about 64 or more), the increase in buffer size will undesirably impact the size of an integrated circuit device comprising the buffer circuits, thereby increasing cost. A second drawback to this buffer circuit arrangement is the need for a reference current from a PVT control circuit. Since it is not desirable to share currents across several buffer circuits, the number of PVT control circuits would likely increase, thereby adding unnecessary circuit complexity and size to the integrated circuit.

Figure 4:
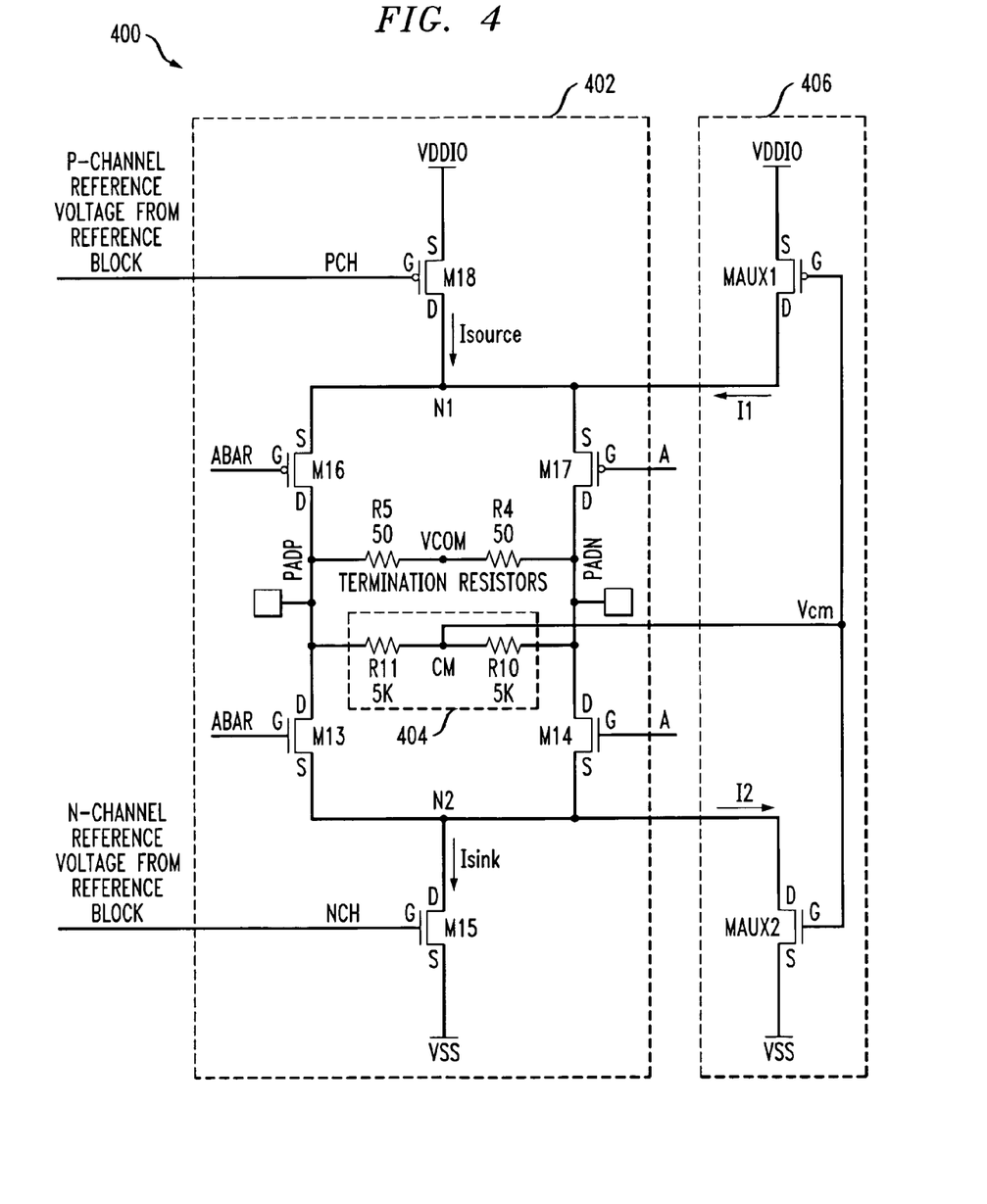
FIG. 4 is a schematic diagram depicting an exemplary differential buffer circuit, formed in accordance with one aspect of the present invention.

FIG. 4 is a schematic diagram depicting an exemplary buffer circuit 400, formed in accordance with one embodiment of the present invention. Buffer circuit 400 is a differential buffer and is well-suited for use, for example, in LVDS applications. In a manner consistent with the buffer circuits previously described, buffer circuit 400 comprises an "H" bridge 402 including NMOS devices M13, M14 and M15, and PMOS devices M16, M17 and M18. Device M18 forms a current source for providing a current, Isource, to the "H" bridge 402, and device M15 forms a current sink for pulling a current, Isink, from the "H" bridge. Ideally, the respective magnitudes of the source and sink currents Isource, Isink will be substantially equal to one another. Devices M13, M14, M16 and M17 serve as switches for selectively controlling a direction of current flowing through differential outputs of the "H" bridge 402 as a function of one or more data input signals presented to the buffer circuit 400. It is to be appreciated that alternative circuit arrangements may be similarly employed, in accordance with the invention, for generating a substantially constant current source and current sink, and for selectively controlling a direction of current flowing through differential outputs of the buffer circuit 400.

The "H" bridge 402 is preferably configured such that a source of device M18 is adapted for connection to a first voltage supply, which may be VDDIO, a drain of M18 is connected to a source of device M16 and a source of device M17 at node N1, and a gate of M18 is adapted for receiving a first bias signal, PCH. A source of device M15 is adapted for connection to a second voltage supply, which may be VSS, a drain of M15 is connected to a source of device M13 and a source of device M14 at node N2, and a gate of M15 is adapted for receiving a second bias signal, NCH. Bias signals PCH and NCH are preferably supplied by an external reference block (not shown) and are used for controlling a magnitude of the source and sink currents, respectively. Alternatively, bias signals PCH and NCH may be generated locally within the buffer circuit 400.

Drains of devices M16 and M17 are preferably connected to drains of devices M13 and M14 at nodes PADP and PADN, respectively. Node PADP is preferably coupled to a first signal pad of the buffer circuit 400 and node PADN is preferably coupled to a second signal pad of the circuit. Nodes PADP and PADN form differential outputs of the buffer circuit 400. External termination resistors, namely, resistors R4 and R5, are preferably connected in series between the differential outputs of the buffer circuit 400. Specifically, a first terminal of resistor R5 is connected to node PADP, a first terminal of resistor R4 is connected to node PADN, and second terminals of R4 and R5 are connected together at a common node, VCOM. Termination resistors R4, R5 preferably have a resistance of about 50 ohms each, as is common in output termination circuitry, although the present invention is not limited to the specific resistance values shown. Gates of devices M14 and M17 are adapted for receiving a first input signal, A, and gates of devices M13 and M16 are adapted for receiving a second input signal, ABAR, which is preferably a logical complement of signal A.

Buffer circuit 400 further includes a common mode detection circuit 404 and a local common mode control circuit 406. The common mode detection circuit 404 is preferably used in conjunction with the common mode control circuit 406 to advantageously adjust the output common mode voltage of the buffer circuit 400 so as to maintain the common mode voltage of the buffer circuit at a certain value. Although the common mode detection circuit 404 and the common mode control circuit 406 are depicted as separate functional blocks for ease of explanation, these blocks may be combined together. Furthermore, the common mode detection circuit 404 and/or common mode control circuit 406 may be integrated with one or more other portions of the buffer circuit 400, as will be apparent to those skilled in the art. For example, common mode detection circuit 404 may be integrated with the "H" bridge 402.

The common mode detection circuit 404 is preferably connected between the differential outputs of the buffer circuit 400 at nodes PADP and PADN and functions primarily to monitor an output common mode voltage of the buffer circuit 400. Common mode detection circuit 404 preferably comprises a resistor divider including resistors R10 and R11, or alternative resistive elements (e.g., PMOS device, NMOS device, etc.) connected in series between nodes PADP and PADN, although alternative circuit configurations are similarly contemplated for monitoring the output common mode voltage. A first terminal of resistor R11 is connected to node PADP, a first terminal of resistor R10 is connected to node PADN, and second terminals of R10 and R11 are connected together at a common node, CM. Although only two resistors are shown in the detection circuit, the invention is not limited to any particular number of resistors. The resistance values of resistors R10, R11 are preferably selected such that a voltage, $V_{CM}$, at node CM is substantially equal to a middle point between the voltages at nodes PADP and PADN. In the illustrative embodiment shown, each of resistors R10, R11 has a resistance of about 5 kilo (K) ohms so as to minimize current consumption in the buffer circuit 400.

The detected common mode voltage $V_{CM}$ is preferably fed to the common mode control circuit 406 for selectively adjusting the output common mode voltage of the buffer circuit 400 as a function thereof. The common mode control circuit 406 preferably comprises a PMOS device MAUX1 and a NMOS device MAUX2. A source of device MAUX1 is adapted for connection to VDDIO, a drain of MAUX1 is connected to node N1 of the "H" bridge 402, and a gate of MAUX1 is adapted for receiving the detected common mode voltage $V_{CM}$. A source of device MAUX2 is adapted for connection to VSS, a drain of MAUX2 is connected to node N2 of the "H" bridge 402, and a gate of MAUX2 is adapted for receiving the detected common mode voltage $V_{CM}$. The common mode control circuit 406 preferably supplies a current, I1, to the "H" bridge 402 and pulls a current, I2, from the "H" bridge. The respective magnitudes of the currents I1, I2 will be a function of the detected common mode voltage $V_{CM}$. The change in magnitude of current I1 is preferably inversely proportional relative to the change in magnitude of current I2, such that as I1 increases, I2 will decrease, and vice versa. At a particular common mode voltage $V_{CM}$, I1 will be substantially equal to I2.

As previously stated, the bias voltages PCH and NCH appearing at the gates of devices M18 and M15, respectively, may include offsets and/or mismatches. For example, there may be voltage drops between the supply voltages of the reference block generating the bias voltages and the local supply voltages of the buffer circuit 400. When the output common mode voltage $V_{CM}$ of the buffer circuit is greater than an intended value, due at least in part to offsets and/or mismatches on the bias voltages PCH and/or NCH, a gate-to-source voltage, Vgs, of device MAUX2 will increase and a Vgs of device MAUX1 will decrease. With device MAUX2 operating at a higher Vgs, the current I2 through MAUX2 will increase. Likewise, with device MAUX1 operating at a lower Vgs, the current through MAUX1 will decrease. Thus, the current supplied to the "H" bridge 402 will be less than the current pulled from the "H" bridge, thereby forcing the common mode voltage $V_{CM}$ lower toward the intended value. Similarly, when the common mode voltage $V_{CM}$ is lower than the intended value, the Vgs of device MAUX2 will decrease and the Vgs of device MAUX1 will increase, thereby forcing the output common mode voltage $V_{CM}$ to increase to the intended value. In this manner, the buffer circuit 400 implements local feedback loops (e.g., between nodes CM and N1, and between nodes CM and N2) for selectively controlling the output common mode voltage of the buffer circuit, without the use of operational amplifiers and related compensation circuitry.

The sizing of devices MAUX1 and MAUX2, which may be defined as a width-to-length ratio (W/L) of a channel in a given device, is preferably selected in relation to the sizing of devices M18 and M15, respectively, to ensure optimal functioning of the buffer circuit. For example, it is possible to size devices MAUX1 and MAUX2 such that under extreme fast conditions (e.g., fast process, high temperature, high supply voltage) most (e.g., about 90 percent) of the current in the buffer circuit 400 flows through devices MAUX1 and MAUX2, and only a small portion (e.g., about 10 percent) of the total current in the buffer circuit flows through devices M18 and M15.

Figure 5:
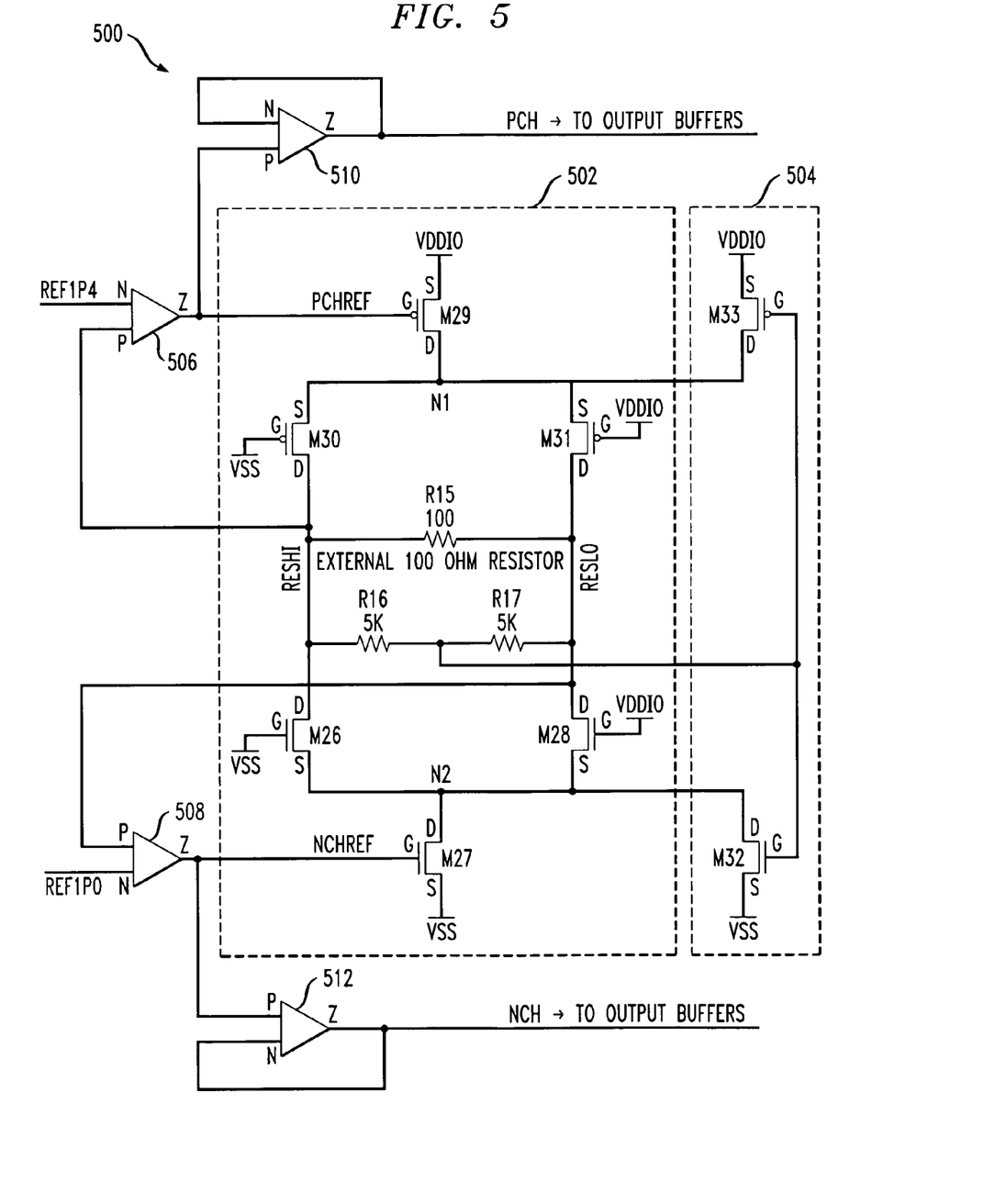
FIG. 5 is a schematic diagram depicting an exemplary reference bias circuit which may be used for generating bias signals used in the buffer circuit shown in FIG. 4, in accordance with another aspect of the present invention.

In order to compensate for variations in characteristics of devices MAUX1 and MAUX2 over PVT conditions to which the buffer circuit 400 may be subjected, one or both of devices MAUX1 and MAUX2 may be placed inside feedback loops of a reference bias circuit, similar to reference bias circuit 200 shown in FIG. 2, which may be used for generating the bias signals PCH and NCH. FIG. 5 is a schematic diagram depicting an exemplary reference bias circuit 500 which incorporates this additional feature, in accordance with another aspect of the invention.

The exemplary reference bias circuit 500 comprises a reference "H" bridge 502 connected to a common mode control circuit 504. The "H" bridge 502 and common mode control circuit 504 may be configured in a manner consistent with that described above in conjunction with FIG. 4. Specifically, reference "H" bridge 502 includes PMOS devices M29, M30 and M31, and NMOS devices M26, M27 and M28. A source of device M29 is adapted for connection to first voltage supply VDDIO, a drain of M29 is connected to sources of devices M30 and M31 at node N1, and a gate of M29 is adapted for receiving a first bias signal, PCHREF. A drain of device M30 is connected to a drain of device M26 at node RESHI, a drain of device M31 is connected to a drain of device M28 at node RESLO, a gate of M30 is adapted for connection to second voltage supply VSS (e.g., ground), and a gate of M31 is adapted for connection to VDDIO. Nodes RESHI and RESLO form differential outputs of the reference "H" bridge 502. Sources of devices M26 and M28 are connected to a drain of device M27 at node N2, a source of M27 is adapted for connection to VSS, and a gate of M27 is adapted for receiving a second bias signal, NCHREF. Devices M29 and M27 will serve as a current source and current sink, respectively, and devices M26, M28, M30 and M31 will function as switches to selectively control the direction of current flowing through the reference "H" bridge 502.

An external termination resistor, R15, having a resistance of about 100 ohms is preferably connected between nodes RESHI and RESLO. Termination resistor R15 has a resistance that is preferably substantially matched to the resistance of the series combination of termination resistors R4 and R5 in the buffer circuit 400 of FIG. 4. With the gates of devices M26, M28, M30, M31 connected in the manner shown, M30 and M28 will be turned on and M26 and M31 will be turned off. Therefore, current will flow from the current source comprising device M29, through device M30, through output node RESHI, through termination resistor R15, back through node RESLO, through device M28, through the current sink comprising device M27, to VSS.

The common mode control circuit 504 preferably comprises a PMOS device M33 and a NMOS device M32 connected in a manner consistent with the common mode control circuit 406 in the buffer circuit 400 of FIG. 4. Specifically, a source of device M33 is adapted for connection to VDDIO, a drain of M33 is connected to a drain of device M32, and a source of M32 is adapted for connection to VSS. A gate of device M33 is connected to the reference "H" bridge 502 at node N1, and a gate of device M32 is connected to node N2 of the reference "H" bridge.

The reference bias circuit 500 preferably includes a PVT control block which incorporates a replica bias circuit. The reference bias circuit 500 employs one or more feedback control loops to derive the bias signals PCH and NCH used in the buffer circuit 400 (FIG. 4). In a first feedback loop, a first operational amplifier 506 is configured having a first input, which may be a non-inverting input, connected to output node RESHI of the reference "H" bridge 502, a second input, which may be an inverting input, adapted for receiving a first reference signal REF1P4 (e.g., about 1.4 volts), and an output for generating the first bias signal PCHREF supplied to the gate of device M29. Operational amplifier 506 will control the voltage at the gate of device M29 so as to maintain at voltage at node RESHI which is substantially equal to the first reference signal REF1P4. Reference signal REF1P4 may be generated externally with respect to the reference bias circuit 500. Alternatively, reference signal REF1P4 may be generated within the reference bias circuit 500, such as by a bandgap reference circuit (not shown) included in the reference bias circuit.

In a second feedback loop, a second operational amplifier 508 is configured having a first input, which may be a non-inverting input, connected to output node RESLO of the reference "H" bridge 502, a second input, which may be an inverting input, adapted for receiving a second reference signal REF1P0 (e.g., about 1.0 volts), and an output for generating the second bias signal NCHREF supplied to the gate of device M27. Operational amplifier 508 will control the voltage at the gate of device M27 so as to maintain a voltage at node RESLO which is substantially equal to the second reference signal REF1P0. Like reference signal REF1P4, reference signal REF1P0 may be generated externally with respect to the reference bias circuit 500. Alternatively, reference signal REF1P0 may be generated within the reference bias circuit 500, such as by a bandgap reference circuit (not shown) included in the reference bias circuit. In fact, reference signal REF1P0 may be generated from reference signal REF1P4, such as by using a voltage divider circuit.

In order to drive a large number of buffer circuits, bias signal PCHREF generated at the output of operational amplifier 506 and bias signal NCHREF generated at the output of operational amplifier 508 may be buffered using operational amplifiers 510 and 512, respectively, connected in a unity gain configuration. Specifically, a first input, which may be a non-inverting input, of operational amplifier 510 is adapted for receiving the bias signal PCHREF and a second input, which may be an inverting input, of operational amplifier 510 is connected to an output of operational amplifier 510 for generating bias signal PCH supplied to the gate of device M18 in the buffer circuit 400 of FIG. 4. Similarly, a first input, which may be a non-inverting input, of operational amplifier 512 is adapted for receiving bias signal NCHREF and a second input, which may be an inverting input, of operational amplifier 512 is connected to an output of operational amplifier 512 for generating bias signal NCH supplied to the gate of device M15 in the buffer circuit 400 of FIG. 4. As previously stated, bias signals PCH and NCH generated by reference bias circuit 500 may be similarly used for biasing a large number of buffer circuits.

Auxiliary devices, namely, MAUX1 and MAUX2, are preferably connected inside the feedback loops of the PVT reference control circuit 500. The feedback loops in the reference bias circuit 500 are configured such that the strength (e.g., Vgs) of the primary devices, namely, M27 and M29, is adjusted to compensate for variations in characteristics of the auxiliary devices MAUX1, MAUX2.

At least a portion of the buffer circuit of the present invention may be implemented in an integrated circuit. In forming integrated circuits, a plurality of identical die is typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A differential buffer circuit, comprising:
   a current source;
   a current sink;
   a switching circuit connected to the current source at a first node and connected to the current sink at a second node, the switching circuit being operative to selectively control a direction of current flowing through differential outputs of the buffer circuit in response to at least a first control signal applied to the switching circuit;
   a common mode detection circuit connected to the differential outputs of the buffer circuit, the common mode detection circuit being operative to detect an output common mode voltage of the buffer circuit and to generate a second control signal representative of the output common mode voltage; and
   a common mode control circuit having a first terminal connected to the current source and a second terminal connected to the current sink, the common mode control circuit being operative to selectively control the output common mode voltage of the buffer circuit as a function of the second control signal.

2. The circuit of claim 1, wherein the common mode control circuit comprises:
   a first transistor having a first bias terminal adapted for connection to a first voltage source providing a first voltage, a second bias terminal connected to the first node of the switching circuit, and a control terminal adapted to receive the second control signal; and
   a second transistor device having a first bias terminal adapted for connection to a second voltage source providing a second voltage, a second bias terminal connected to the second node of the switching circuit, and a control terminal adapted to receive the second control signal.

3. The circuit of claim 2, wherein the first transistor comprises a PMOS device, the first bias terminal of the first transistor being a source of the PMOS device, the second bias terminal of the first transistor being a drain of the PMOS device, and the control terminal of the first transistor being a gate of the PMOS device.

4. The circuit of claim 2, wherein the second transistor comprises an NMOS device, the first bias terminal of the second transistor being a source of the NMOS device, the second bias terminal of the second transistor being a drain of the NMOS device, and the control terminal of the second transistor being a gate of the NMOS device.

5. The circuit of claim 1, wherein the common mode control circuit is operative to supply a first current to the first node of the switching circuit and to remove a second current from the second node of the switching circuit, a magnitude of the first and second currents being controlled as a function of the second control signal.

6. The circuit of claim 5, wherein the common mode control circuit is configured such that a magnitude of the first current supplied to the first node of the switching circuit is inversely proportional to a magnitude of the second control signal, and a magnitude of the second current removed from the second node of the switching circuit is proportional to the magnitude of the second control signal.

7. The circuit of claim 5, wherein the common mode control circuit is configured such that a change in magnitude of the first current is inversely proportional to a change in magnitude of the second current.

8. The circuit of claim 1, wherein the current source comprises a PMOS device including a first source/drain adapted for connection to a first voltage source providing a first voltage, a second source/drain connected to the first node, and gate adapted to receive a first bias signal for controlling a magnitude of a first current supplied by the current source.

9. The circuit of claim 1, wherein the current sink comprises an NMOS device including a first source/drain adapted for connection to a second voltage source providing a second voltage, a second source/drain connected to the second node, and gate adapted to receive a second bias signal for controlling a magnitude of a second current returned to the second voltage source.

10. The circuit of claim 1, wherein the common mode detection circuit comprises a resistor divider connected between the differential outputs of the buffer circuit, the resistor divider being operative to generate a voltage which is substantially equal to a middle point between the respective voltages at the differential outputs of the buffer circuit.

11. The circuit of claim 1, wherein the common mode detection circuit comprises a first resistive element connected between one of the differential outputs of the buffer circuit and a common mode node, and a second resistive element connected between another of the differential outputs of the buffer circuit and the common mode node, a resistance of the first resistive element being substantially equal to a resistance of the second resistive element.

12. The circuit of claim 1, wherein the switching circuit comprises:
   a first transistor device of a first polarity type including a first bias terminal connected to the current source, a second bias terminal connected to a first differential output of the buffer circuit, and a control terminal adapted to receive the first control signal;
   a second transistor device of a second polarity type including a first bias terminal connected to the first differential output, a second bias terminal connected to the current sink, and a control terminal adapted to receive the first control signal;
   a third transistor device of the first polarity type including a first bias terminal connected to the current source, a second bias terminal connected to a second differential output of the buffer circuit, and a control terminal adapted to receive a logical complement of the first control signal; and
   a fourth transistor device of the second polarity type including a first bias terminal connected to the second differential output, a second bias terminal connected to the current sink, and a control terminal adapted to receive the logical complement of the first control signal.

13. The circuit of claim 1, wherein the switching circuit comprises:
   a first PMOS transistor including a first source/drain connected to the current source, a second source/drain connected to a first differential output of the buffer circuit, and a gate adapted to receive the first control signal;
   a first NMOS transistor including a first source/drain connected to the first differential output, a second source/drain connected to the current sink, and a gate adapted to receive the first control signal;

a second PMOS transistor including a first source/drain connected to the current source, a second source/drain connected to a second differential output of the buffer circuit, and a gate adapted to receive a logical complement of the first control signal; and a second NMOS transistor including a first source/drain connected to the second differential output, a second source/drain connected to the current sink, and a gate adapted to receive the logical complement of the first control signal.

14. The circuit of claim 1, further comprising an "H" bridge, the "H" bridge comprising the current source, the current sink and the switching circuit.

15. The circuit of claim 1, further comprising a reference bias circuit for generating the first and second bias signals, the reference bias circuit being operative to control the first and second bias signals as a function of a variation in at least one of a process, a supply voltage and a temperature condition of the buffer circuit.

16. The circuit of claim 1, further comprising a reference bias circuit operative to generate first and second bias signals for controlling a magnitude of a first current supplied by the current source and a magnitude of a second current sunk by the current sink, respectively, the reference bias circuit comprising:

an "H" bridge circuit including a second current source for supplying a third current as a function of the first bias signal, a second current sink for returning a fourth current as a function of the second bias signal, and a second switching circuit connected to the second current source at a first node and connected to the second current sink at a second node, the second switching circuit being operative to control a direction of current flowing through differential outputs of the "H" bridge circuit in response to at least a third control signal;

a second common mode detection circuit operative to detect an output common mode voltage of the "H" bridge circuit and to generate a fourth control signal representative of the output common mode voltage of the "H" bridge circuit;

a second common mode control circuit having a first terminal connected to the second current source and a second terminal connected to the second current sink, the second common mode control circuit being operative to selectively control the output common mode voltage of the "H" bridge circuit as a function of the fourth control signal;

a first operational amplifier including a first input connected to a first of the differential outputs of the "H" bridge circuit, a second input adapted to receive a first reference signal, and an output for generating the first bias signal; and a second operational amplifier including a first input connected to a second of the differential outputs of the "H" bridge circuit, a second input adapted to receive a second reference signal, and an output for generating the second bias signal.

17. The circuit of claim 16, wherein the reference bias circuit is operative to control the first and second bias signals as a function of at least one of: (i) a variation in at least one of a process, a supply voltage and a temperature condition of the buffer circuit; and (ii) at least one of the first and second reference signals.

18. An integrated circuit including at least one differential buffer circuit, the at least one differential buffer circuit comprising:

a current source;

a current sink;

a switching circuit connected to the current source at a first node and connected to the current sink at a second node, the switching circuit being operative to selectively control a direction of current flowing through differential outputs of the at least one buffer circuit in response to at least a first control signal applied to the switching circuit;

a common mode detection circuit connected to the differential outputs of the at least one buffer circuit, the common mode detection circuit being operative to detect an output common mode voltage of the buffer circuit and to generate a second control signal representative of the output common mode voltage; and a common mode control circuit having a first terminal connected to the current source and a second terminal connected to the current sink, the common mode control circuit being operative to selectively control the output common mode voltage of the at least one buffer circuit as a function of the second control signal.

19. The integrated circuit of claim 18, wherein the common mode control circuit comprises:

a first transistor having a first bias terminal adapted for connection to a first voltage source providing a first voltage, a second bias terminal connected to the first node of the switching circuit, and a control terminal adapted to receive the second control signal; and a second transistor device having a first bias terminal adapted for connection to a second voltage source providing a second voltage, a second bias terminal connected to the second node of the switching circuit, and a control terminal adapted to receive the second control signal.

20. The integrated circuit of claim 18, wherein the common mode control circuit is operative to supply a first current to the first node of the switching circuit and to remove a second current from the second node of the switching circuit, a magnitude of the first and second currents being controlled as a function of the second control signal.

21. A bias circuit operative to generate at least first and second bias signals for biasing a differential buffer circuit, the bias circuit comprising:

an "H" bridge circuit including:
a current source;
a current sink; and
switching circuitry connected to the current source at a first node and connected to the current sink at a second node, the switching circuitry being operative to control a direction of current flowing through differential outputs of the "H" bridge circuit in response to at least a first control signal;

a common mode detection circuit connected to the differential outputs of the "H" bridge circuit, the common mode detection circuit being operative to detect an output common mode voltage of the "H" bridge circuit and to generate a second control signal representative of the output common mode voltage;

a common mode control circuit having a first terminal connected to the current source and a second terminal connected to the current sink, the common mode control circuit being operative to selectively control the output common mode voltage of the "H" bridge circuit as a function of the second control signal;

a first operational amplifier including a first input connected to a first of the differential outputs of the "H" bridge circuit, a second input adapted to receive a first reference signal, and an output for generating the first bias signal; and a second operational amplifier including a first input connected to a second of the differential outputs of the "H" bridge circuit, a second input adapted to receive a second reference signal, and an output for generating the second bias signal.

* * * * *